United States Patent [19]

Reed et al.

[11] Patent Number: 4,475,713
[45] Date of Patent: Oct. 9, 1984

[54] ONE PIECE TOP SEAL FOR A VALVE

[75] Inventors: C. Lawson Reed; J. Anthony George, both of Cincinnati, Ohio

[73] Assignee: Xomox Corporation, Cincinnati, Ohio

[21] Appl. No.: 360,323

[22] Filed: Mar. 19, 1982

[51] Int. Cl.³ .................. F16K 31/44; F16J 15/00
[52] U.S. Cl. .................. 251/214; 251/335 A; 277/105; 277/117
[58] Field of Search .......... 251/335 A, 309, 214; 277/105, 117

[56] References Cited

U.S. PATENT DOCUMENTS

| | | | |
|---|---|---|---|
| 3,508,573 | 4/1970 | Smith | 251/309 |
| 3,540,740 | 11/1970 | Smith | 251/214 |
| 3,703,910 | 11/1972 | Smith | 251/309 |
| 3,930,635 | 1/1976 | Smith | 251/335 A |
| 4,159,818 | 7/1979 | Hoos | 251/214 |
| 4,333,632 | 6/1982 | Smith | 251/335 A |

Primary Examiner—A. Michael Chambers
Attorney, Agent, or Firm—Kinney and Schenk

[57] ABSTRACT

A centrally apertured unitary one piece top seal for a rotary plug valve includes two distinct portions. The first of these portions has a truncated triangular cross sectional configuration with the second portion being circumferentially disposed about the first and being substantially planar. The top seal has a relief area in the first portion at the interface of the aperture defining sidewall and the bottom of the first portion, and a relief shoulder between the first and second portions. The first portion has a height of at least twice that of the second portion and preferably four times that of the second portion.

7 Claims, 3 Drawing Figures

ONE PIECE TOP SEAL FOR A VALVE

BACKGROUND

It is common and usual practice in sealing the top portion of rotary valves, as for example rotary plug valves, to use a top seal that seals against media leakage while simultaneously accommodating rotational movement of the valving element relative to a valve body. A rotary plug valve, for example, has a plug portion which is rotatably fitted within a valve body. This plug portion of the valve is joined by a stem or shaft portion which extends out of the valve body to interact with an actuator and transmit torque to the plug portion. This torque is used to rotate the plug portion within the valve body and to move a passageway in the plug portion of the valve in and out of registry with a flow passage extending through the valve body. In plug valves, it is common practice to seal the top of the valve with a centrally apertured diaphragm with the shaft portion of the valve extending through the central aperture of the top seal. In one type of conventional top seal, a delta ring bearing is circumscribed about the stem or shaft in an interference fit over the diaphragm. A thrust collar is then fitted over the delta ring to urge the delta ring both radially inward toward the rotary shaft and downwardly toward the rotary passageway of the valve. An example of this type of sealing arrangement is seen in U. S. Pat. No. 3,235,272.

Another successful top seal uses a diaphragm with a reversed lip which engages and extends along the stem's periphery. In this sealing arrangement, the diaphragm has a central opening through which the stem extends. The radially intermost portion of the diaphragm in engagement with the stem is folded so as to orient the internal periphery of the opening to extend axially along the stem. In this arrangement, the opening of the diaphragm for the stem is in substantially perpendicular relationship with the outermost and intermediate portions of the diaphragm.

An improvement over the second mentioned type of seal has a diaphragm which greatly resembles that of the reverse lip type seal mentioned above with the improvement including a conforming sealing member which is fitted within the groove formed by the fold of the diaphragm and which urges the intermost portion of the folded diaphragm portion into engagement with the stem.

While all of the above mentioned sealing arrangements have been highly satisfactory, they are not without their attendant disadvantages. For example, these seals are relatively expensive to manufacture and frequently require special assembly tools. Further, the nature of several of the above mentioned sealing designs require that the diaphragms be constructed through a forming operation and these manufacturing techniques impose limitations on the possible materials for the seals.

It is thus an object of the present invention to provide a one piece top seal that may be manufactured more economically than prior art seals of equivalent sealing capability.

It is a further object of the present invention to provide a top valve seal which provides for ease of replacement when the valve is serviced in the field and which does not require special assembly tools.

It is yet another object of the present invention to provide a top seal that may be formed by a machine operation and which may be formed of a large number of different materials.

It is yet another object of the present invention to provide a top seal design that may be used in a fire safe application.

It is yet another object of the present invention to provide a top seal in which the diaphragm thickness is not determined by the space between the valve plug and the thrust collar.

SUMMARY OF THE INVENTION

In accordance with the invention, a top seal for a valve with a rotatable valving member is provided which includes a unitary one piece diaphragm with at least two distinct portions. The diaphragm has a centrally disposed aperature with a first portion being circumferentially disposed proximally to the aperature. A second portion of the diaphragm extends outwardly from and is circumferentially disposed about the first portion, the second portion having a thickness which is substantially less than the first portion. The first portion has a bearing surface which is obliquely oriented with respect to the second portion on the outer surface of the first portion.

In accordance with a further aspect of the invention, the interface of the first and second portion includes a recess between the obliquely oriented bearing surface in the top of the second portion of the diaphragm.

A still further aspect of the invention includes an inner circumferential wall in the first portion of the diaphragm which is in substantially perpendicular relationship to the second portion of the diaphragm and a relief area which is disposed between the bottom of the diaphragm and the circumferential wall.

BRIEF DESCRIPTION OF THE DRAWINGS

Other objects and advantages of the invention will become apparent when reading the following detailed description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE PREFERRED EMBODIMENT

Figure 1:
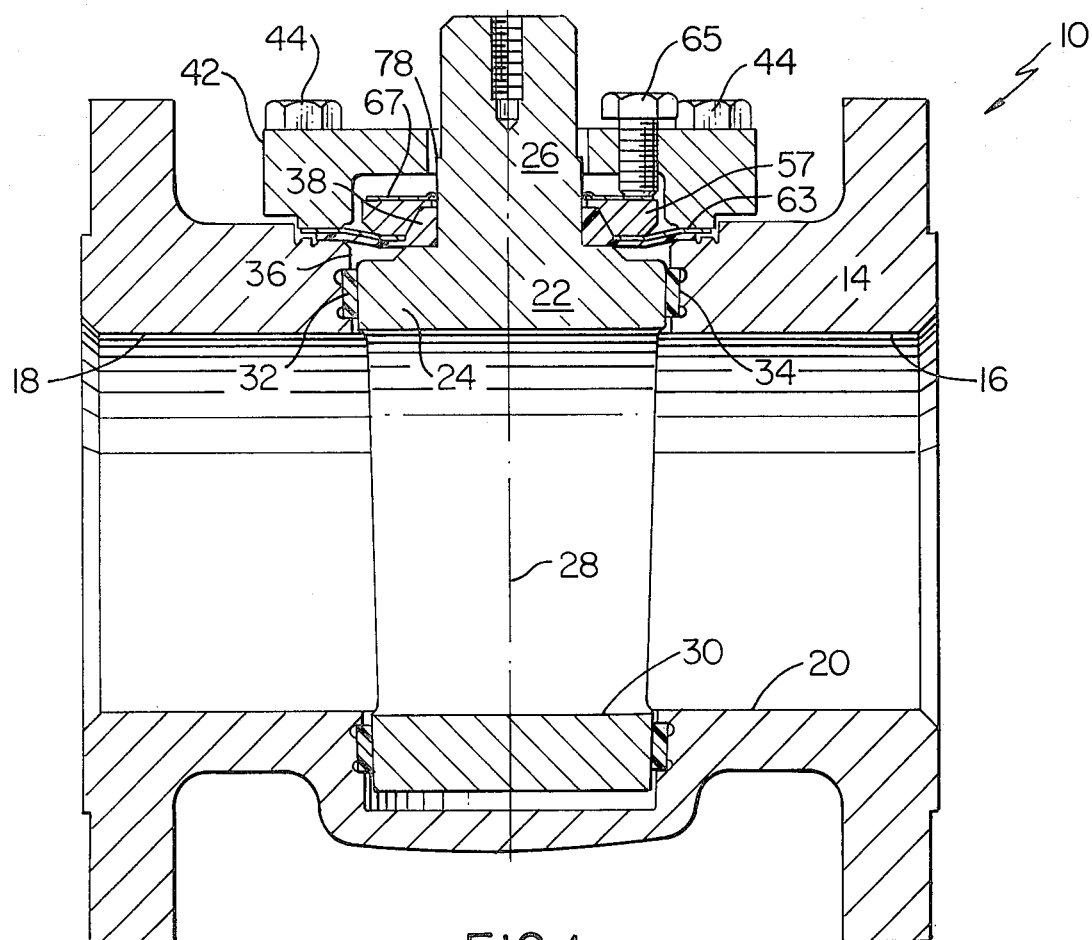
FIG. 1 is an elevational view, partially in cross section, of a plug valve and seal made in accordance with the present invention.

Referring now to the drawings and to FIG. 1 in particular, a plug valve 10 constructed in accordance with the present invention is shown. The plug valve 10 includes a valve body 14 having an inlet 16 and an outlet 18 with an internal flow passage 20 extending therebetween. A rotatable valving member 22 extends across the internal flow passage 20 to selectively block fluid flow therethrough. This valving member 22 is rotatably disposed within the valve body 14 of the illustrated embodiment and has a plug portion 24 which extends across the flow passage 20. A stem portion 26 of the rotatable valving member 22 is integrally attached to the plug portion 24 to extend out of the valve body 14. Under normal circumstances, the stem portion 26 is interconnected with an actuator (not shown, either manual or automatic) which transmits a torque to the valving member 22 to effectuate relative rotation of the valving member 22 relative to the valve body 14 along a rotational axis 28.

The plug portion 24 of the valving member 22 has a through opening or passageway 30 therein, as is usual, to be placed in and out of registry with the internal flow passage 20 incident to partial rotation of the valving member 22 about the axis 28. In the illustration of FIG. 1, the valving member 22 is shown in an open position. In this open position, the passageway 30 through the plug portion 24 registers with the internal flow passage 20. As should be readily apparent, the valving member 22 is designed to be rotated about this axis 28 to place its through passageway 30 out of registry with the valve housing's (14) internal flow passage 20 and to completely cut off flow through that internal flow passage 20.

A first or primary sealing member in the form of a sleeve or liner 32 formed of a fluorinated hydrocarbon polymeric material such as polytetrafluoroethylene, sold under the trademark TEFLON, or equivalent material is preferably fitted about the periphery of the plug portion 24 of the valving member 22 and is aperatured in correspondency to that plug portion 24 to permit registry of the plug portions (24) through passageway 30 with the internal flow passage 20 whenever valving member 22 is in the open position illustrated in FIG. 1. The sealing member 32 is snugly fitted in circular grooves 34 on opposite sides of the internal flow passage 20 and provides a seal between the plug portion 24 of the valving member 22 and the valve body 14.

As mentioned above, the stem or shaft portion 26 of the valving member 22 extends out of the body 14. In the illustration of FIG. 1, this extension is through an opening 36 in the top of the valve body 14, and for purposes of the present description, this opening will be referred to as a top opening 36 (although the valve could clearly be oriented differently). This top opening 36 is covered with a top seal in a form of a diaphragm 38 made in accordance with the present invention which is aperatured to accommodate the stem portion of the valving member 22 which passes through the diaphragm 38. The diaphragm 38 will initially be described as having been formed of a fluorinated hydrocarbon polymer such as polytetrafluoroethylene or equivalent material. However, as will be highlighted below, the design of the diaphragm is such to permit the use of a wide range of materials to meet a correspondingly wide range of applications.

Figure 3:
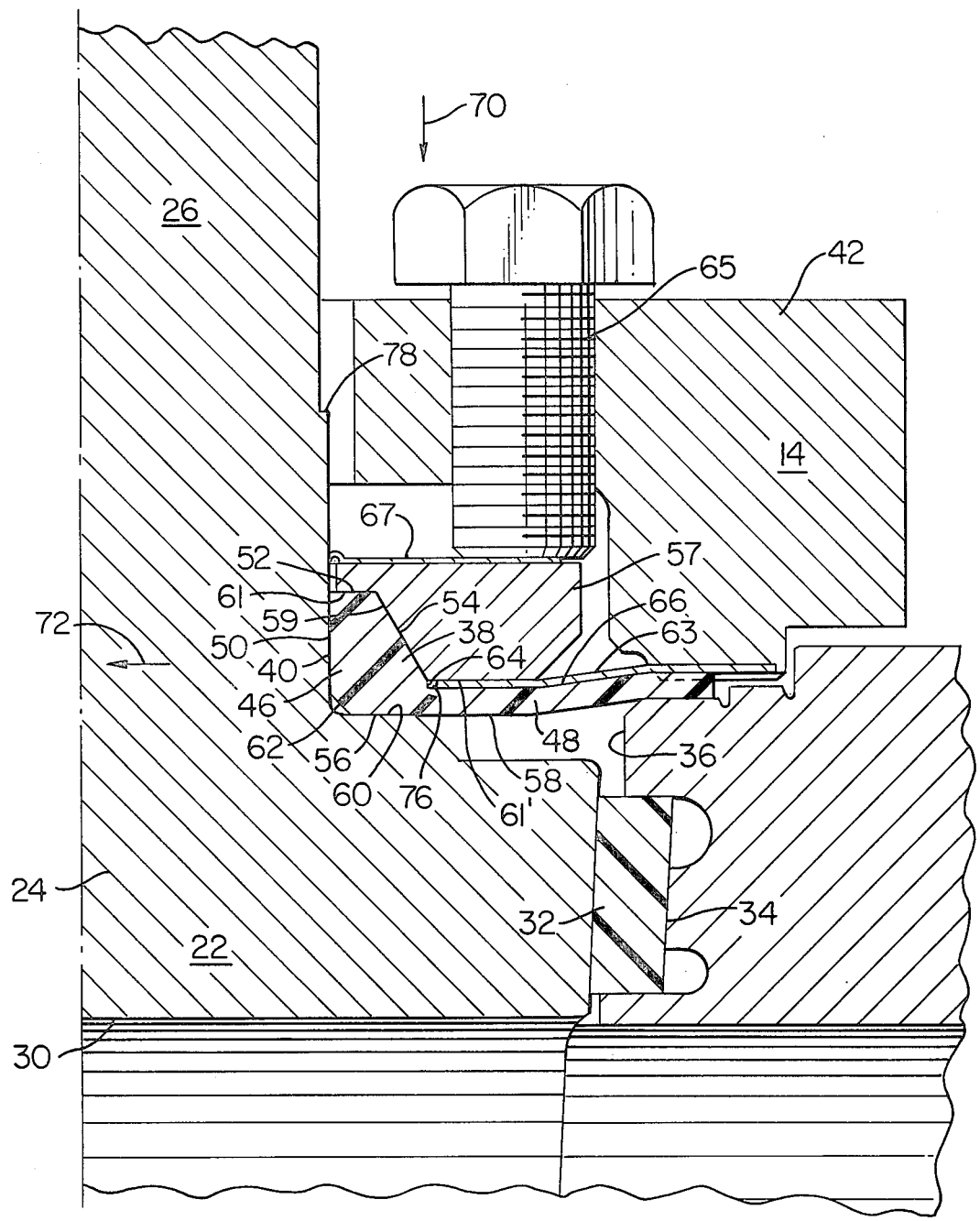
FIG. 3 is an enlarged fragmentary cross sectional view of the top seal of the present invention shown in its cooperative relationship with the valve body and rotatable valving member.

The diaphragm 38 is shown in greater detail in the fragmentary sectional view of FIG. 3. It is seen that the diaphragm 38 has a centrally disposed aperature 40 through which the stem 26 extends and that the diaphragm covers the entire expanse of the opening 36. The top seal diaphragm 38 is secured in the opening 36 by the compressed force of a valve cover 42 which is, in turn, secured to the valve body 14 through the agency of a plurality of bolts 44 (FIG. 1).

The top seal 38 is a unitary one piece construction with at least two distinct portions, a first enlarged portion 46 circumferentially disposed about and proximal to the aperature 40 and a second generally planar portion 48 which is circumferentially disposed about the first portion. The first portion 46 has a generally truncated triangular cross sectional configuration with an inner circumferential wall 50 defining the aperature 40. A top wall 52 adjoins the inner circumferential wall 50 and extends to a bearing surface 54 which is obliquely oriented with respect to both the inner circumferential wall 50 and the substantially planar second portion 48. This obliquely oriented bearing surface is at an angle of approximately 30 degrees to the inner circumferential wall 50. The bottom surface 56 of the first portion 46 is co-planar with the bottom surface 58 of the second portion 48 and generally parallel to the top wall 52. This bottom surface 58 rests upon a shoulder 60 (seen in greater detail in FIG. 2) of the plug portion 24 of the valving member 22. In the preferred embodiment, the first portion 46 of the top seal 38 has a height which is slightly in excess of four times greater than the height of the second portion 48. The first portion 46 must be at least twice the height of the second portion 48. The top seal 38 is a centrally aperatured diaphragm with a buildup circumferentially disposed about the aperature.

A thrust ring 57 has an obliquely oriented bearing surface 59 and an adjoining top bearing surface 61 which cooperatively mates with the obliquely oriented bearing surface 54 and top surface 52 of the first portion 46 of the diaphragm 38 respectively. The thrust ring 57 also has an under surface 61 which bears against a metal backup member 63 interposed between the thrust ring 57 and the second portion 48 of the top seal 38.

Three equally spaced tightening bolts 65 are disposed about the stem 26 (only one of which is shown in FIG. 3) and apply a downward thrust force to the thrust ring 57. This thrust force is applied to the thrust ring 57 through a static eliminator 67 interposed between the tightening bolt 65 and the top seal 38. This static eliminator is formed of an electrically conductive material, such as stainless steel and provides an electrical circuit path between the valve body 14 and the rotatable valve member 22 to prevent static electricity buildup between the elements. The valve body 14 and the valve member 22 are otherwise electrically isolated from each other when top seal 38 is formed of electrically non-conductive material. However, if the top seal 38 is formed of electrically conductive material, a static eliminator is unnecessary.

A relief area 62 is formed in the top seal 38 between the inner circumferential wall 50 and the bottom surface 56. This relief area 62 is provided to permit the top seal material to extrude when subjected to downward thrust of the thrust ring without adversely affecting the sealing forces applied to the valve therethrough. This relief area prevents undue stress of that corner of the top seal.

Figure 2:
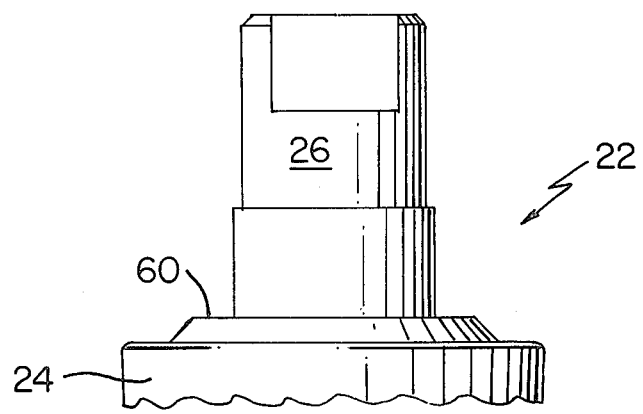
FIG. 2 is a fragmentary elevational view of a portion of the valving member used in the embodiment of FIG. 1.

FIG. 2 also shows that a relief shoulder 64 is formed between the obliquely oriented bearing surface 54 and the top surface 66 of the second portion 48 of the diaphragm 38. Applicant has found that this relief shoulder 64 results in markedably improved sealing of the valve. The recess 64 allows top seal material 38 to be extruded by the interface force between the bearing surface 54 of the diaphragm 38 and the thrust ring 57 to accommodate extrusion of the material without impeding the downward vertical motion of the rotatable valve member 22 relative to the valve body 14. In the absence of such a recess 64, top seal material extruded by the thrust ring 57 would tend to urge the thrust ring 57 away from the top seal 38, countering the sealing force applied by the thrust ring 57.

The top seal 38 and the cooperating components of the valve 10 with which it interacts allow movement between the valve body 14 and the plug 22 to occur without interrupting the seal provided by the top seal 38. Plug portion 22 has a taper of approximately 2° from the top of the plug (proximal to stem 26) to the lower portion of the plug (distal to the stem 26). This taper of the plug 26 allows for downward adjustability of the plug by increasing the pressure of tightening bolt 65. Downward adjustment of plug 22 relative to the body 14 increases the service pressure of the valve 10, permitting use of higher pressurized media without leakage. Increasing the surface pressure of the valve also increases the torque required to rotate the plug 22 relative to the body 14.

Tightening of the seal tightening bolt 65 applies a downward force on the thrust collar 57 through the static eliminator 67. This downward force is principally applied to the obliquely oriented bearing surface 54 which, in turn, applies a force to the rotatable valving member 22 in a direction substantially perpendicular to that of the bearing surface 54. The result in the force applied to the rotating valving member 22 has two components, a first downward component in the direction of arrow 70 and a second horizontal component in the direction of arrow 72. The two resulting components of force urge the top seal 38 in sealing engagement with both the stem portion 26 and the shoulder 60 of the rotatable valving member.

It has been found that the ratio and balance of the forces represented by arrow 70 and 72 are important to sealing of the valve 10. This unique one-piece construction of the top seal 38 with the obliquely oriented bearing surface 58 allows for the development of these forces and eliminates the potential force imbalances resulting from interaction of multiple sealing components which are movable relative to each other. As mentioned above, a relief area or recess 62 is provided between the inner circumferential wall 50 and the bottom surface 56. Applicant has found that this recess 62 permits this corner location of the top seal 38 from becoming unduly stressed and prevents imbalance of forces presented by arrow 70 and 72 in high pressure situations.

In high pressure situations, it is important to keep the material of the first portion 46 of the top seal 38 away from the top surface 66 of the second portion 48. The relief shoulder 64, discussed above, serves this purpose by allowing a place for material extruded from the obliquely oriented bearing surface 54 and preventing the extruded material from fighting the seal. The gap 76 between the metal backup member 63 and the first portion 46 of the top seal 38 also assist in this function.

The one piece top seal 38 of the present invention has significant advantages over prior art seals. It can be manufactured as a single piece screw machined product or as a single piece molded product and thus is economically advantageous over contemporary top seals. Lip seal type designs also require special assembly tools to protect the lip, tools that are also needed for repair and field service. The design of the present invention does not require special assembly tools, which results in lower assembly cost for the present design. Assembly of the instant invention and pulling the top seal 38 over flat 78 on the shank on stem 26 of the valving member 22 is also assisted by relief area 62 which leads top seal 38 over those flats 78.

The design of the present invention also permits formation of the top seal 38 by a machine process and does not restrict it to a forming process as do many of the prior art designs. Thus, it is possible to use a wide range of materials that are not readily formable. The top seal 38 could, for example, be formed of a metal material such as copper or lead for use in a fire safe design.

Thus, it is apparent that there has been provided, in accordance with the invention, a top seal that fully satisfies the objects, aims and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the amended claims.

We claim:

1. A rotary valve, said valve comprising:
   a valve body, said valve body having flow passages therethrough;
   a cavity, said cavity being located in said valve body, said cavity having an opening in said top of said valve body;
   a top closure, said closure being bolted to said valve body over said cavity;
   a valve member;
   a primary sealing member;
   a stem, said stem being integral with said valve member, said stem being rotatable in said cavity in said valve body; and
   a top seal assembly, said assembly having a unitary one piece construction, said top seal assembly being secured in position said top closure, said assembly having a centrally disposed aperture, said seal assembly having at least two distinct portions, a first enlarged portion and a second generally planar portion, said first portion being circumferentially disposed about and proximal to said aperture, said second portion being circumferentially disposed about said first portion, said first portion having a generally truncated triangular cross sectional configuration, said first portion having an inner circumferential wall defining said aperture, said first portion having a top wall, said top wall adjoins said inner circumferential wall, said top wall extends to a bearing surface, said bearing surface is a obliquely oriented with respect to both the inner circumferential wall and said planar second portion, said first portion having a bottom surface, said bottom surface being co-planar with said second portion, said bottom surface being substantially parallel to said top wall, said first portion of said top seal assembly having a heighth of at least twice the height of said second portion.

2. The top seal assembly as recited in claim 1 wherein said seal assembly is constructed out of a fluorinated hydrocarbon polymer.

3. The top seal assembly as recited in claim 1, said assembly further comprising:
   means for permitting the material of said top seal to extrude when said material is subjected to downwardly compressing forces without adversely affecting the sealing forces.

4. The top seal assembly as recited in claim 2, wherein said means for permitting said top seal material to extrude is a relief area, said relief area being located between said inner circumferential wall and said bottom surface.

5. The top seal assembly as recited in claim 2, said assembly further comprising:
   means for allowing said top seal material to be extruded by the interface force between said bearing surface of said seal assembly and a thrust ring, said means for allowing accomodating extrusion of said seal material without impeding the downward vertical motion of said valve member relative to said valve body.

6. The top seal as recited in claim 5, wherein said means for allowing said seal material to be extruded by said interface forces is a relief shoulder, said shoulder being formed between said obliquely oriented bearing surface and the said top surface of said second portion of said top seal assembly.

7. The top seal assembly as recited in claim 1, wherein said bearing surface is oriented at an angle of approximately 30 degrees relative to said inner circumferential wall.

* * * * *

UNITED STATES PATENT AND TRADEMARK OFFICE
CERTIFICATE OF CORRECTION

PATENT NO. : 4,475,713
DATED : October 9, 1984
INVENTOR(S) : C. Lawson Reed et al It is certified that error appears in the above-identified patent and that said Letters Patent are hereby corrected as shown below:

Column 6, line 37, after "position", insert --by--;

line 58, delete "heighth" and insert --height--.

Column 7, line 8, after "allowing", insert --the material of--;

line 8, delete "material".

Signed and Sealed this

Eleventh Day of June 1985

[SEAL]

Attest:

DONALD J. QUIGG

Attesting Officer    Acting Commissioner of Patents and Trademarks